(12) United States Patent
Maurya et al.

(10) Patent No.: US 11,074,268 B2
(45) Date of Patent: Jul. 27, 2021

(54) SYSTEM AND METHOD FOR AUTOMATICALLY ANALYZING OPERATIONAL DATA USING WEB-BASED MULTI-TENANT PRODUCT INTELLIGENCE FRAMEWORK

(71) Applicant: HCL Technologies Ltd., Chennai (IN)

(72) Inventors: Arvind Kumar Maurya, Noida (IN); Dhanyamraju S U M Prasad, Hyderabad (IN); Yogesh Gupta, Noida (IN); Ravi Prasad, Noida (IN); Karuna Sharma, Noida (IN)

(73) Assignee: HCL TECHNOLOGIES LTD, Chennai (IN)

( * ) Notice: Subject to any disclaimer, the term of this patent is extended or adjusted under 35 U.S.C. 154(b) by 0 days.

(21) Appl. No.: 14/335,951

(22) Filed: Jul. 21, 2014

(65) Prior Publication Data
US 2020/0192909 A1    Jun. 18, 2020

(30) Foreign Application Priority Data
Jul. 22, 2013  (IN) .......................... 3253/CHE/2013

(51) Int. Cl.
*G06F 16/30* (2019.01)
*G06F 16/25* (2019.01)
*G06N 5/04* (2006.01)
*G06N 20/00* (2019.01)

(52) U.S. Cl.
CPC .......... *G06F 16/254* (2019.01); *G06F 16/258* (2019.01); *G06N 5/04* (2013.01); *G06N 20/00* (2019.01)

(58) Field of Classification Search
CPC ............................. G06F 16/258; G06F 16/254
USPC ....... 707/607, 609, 687, 709, 769, 790, 813, 707/821
See application file for complete search history.

(56) References Cited

U.S. PATENT DOCUMENTS

2008/0027830 A1*  1/2008  Johnson ............. G06Q 30/0625
                                                       705/14.68
2009/0106082 A1*  4/2009  Senti ...................... G06Q 30/02
                                                       705/7.33

* cited by examiner

*Primary Examiner* — Sana A Al-Hashemi
(74) *Attorney, Agent, or Firm* — Mannava & Kang, P.C.; Vinay Malik (57) ABSTRACT

The embodiments herein relate to operational data analysis (ODA) and, more particularly to automate operational data analysis and generate the analysis report for various products using a web-based multi-tenant product intelligence framework. The system allows the user to configure a data collection process, define schema structure, select a data storage for storing the collected data, select or create a data formatting algorithm, and generate a data report to perform the ODA process. Based on the ODA report, appropriate decisions can be taken by an organization.

13 Claims, 11 Drawing Sheets

SYSTEM AND METHOD FOR AUTOMATICALLY ANALYZING OPERATIONAL DATA USING WEB-BASED MULTI-TENANT PRODUCT INTELLIGENCE FRAMEWORK

FIELD OF INVENTION

The embodiments herein relate to operational data analysis and, more particularly to automate operational data analysis and generate the analysis report for various products using a web-based multi-tenant product intelligence framework.

BACKGROUND

In the current scenario, business data volume from various industries is exceeding the limit to perform data analysis on a platform. Additionally, the type of data formats and the data types supported by various products or applications are increasing drastically. As the number of data sources or data storage mechanism increases, the number of data types and data formats supported also increases. With this scenario, it is challenging for industries to provide platform independent, faster, reliable, and accurate data analysis mechanism and implement product intelligence within a framework that can directly impact the business decisions.

In one of the existing system and method, an analytical platform is supported for analyzing both traditional relational data and new generation extensible data formats which is based on XML, HTML, E-mail, Excel, PDF, and others. Further, the system supports data acquisition using a pre-defined schema by using an XML or an HTML file. Additionally, the system provides intelligence to capture the relationship between existing tables. However, the system and method does not support an interface to configure the product intelligence framework and collaborate with the data acquired from various sources for further processing. Also, the current system and method does not support schema creation (during run-time) by uploading a sample schema file or while connecting to the data source for data collection.

In another existing system and method, a web-based multi-tenant database is used in the design of the product intelligence framework that can collect data from multiple sources. Additionally, the framework captures the relationship between the tables provided for product analysis and provides user-specific lexicography for data mapping. However, the system and method does not support multi-structured data (relational and non-relational) collection and collaboration, and does not support schema creation during data collection. In another existing system and method, the data analysis is performed based on specific rules and activities configured in a framework. The framework collects data from multiple sources and a relationship is established between the tables. However, the existing system and method does not provide a web-based multi-tenant interface for the user to configure the framework. Also, the system and method does not support data formatting using various customized logic in sequence. The data analysis is done based on the requirement and does not allow the users to configure the data analysis during a system run-time.

In another existing system and method, an automated data abstraction generation is performed using a schema created by using an XML or an SQL file. The system enables users to collect data from multiple sources and collaborate with multi-structured data for analysis. Additionally, the system posses the intelligence to capture relationship between tables. However, the system does not provide a web-based multi-tenant framework for users to manage the system. The system performs data abstraction generation based on the requirement and does not allow users to configure data abstraction during run-time.

SUMMARY

In view of the foregoing, an embodiment herein provides a method for automating operational data analysis on a multi-structured data, the method comprises collecting data based on a pre-defined schema from at least one of a plurality of data sources using at least one data collection service; formatting the stored data to at least one specific format; analyzing the formatted data; and reporting the analyzed data.

Embodiments further disclose a system for automating operational data analysis on a multi-structured data, the system provided with means for collecting data based on a pre-defined schema from at least one of a plurality of data sources using at least one data collection service using a product intelligence and analytic framework; formatting the stored data to at least one specific format using the product intelligence and analytic framework; analyzing the formatted data using the product intelligence and analytic framework; and reporting the analyzed data using the product intelligence and analytic framework.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method to automate an operational data analysis (ODA) using a web-based multi-tenant framework by automatically collaborating multi-structured data received from various sources, storing the data in a data warehouse, formatting the stored data using customized algorithm, mining the stored data, and analyzing the data for generating report. Referring now to the drawings, and more particularly to FIGS. 1 through 11, where similar reference characters denote corresponding features consistently throughout the figures, there are shown embodiments.

In an embodiment, the ODA is an automated process of monitoring the performance of a system by storing the collected data in a specific format, analyzing the data, and generating the analysis results. The system for which the ODA is performed must comprise the components for collecting the data from various sources, formatting the data as required, analyzing the data based on requirement, and generating the analysis results. Extracting patterns from the ODA enables the users to predict potential failures, or to suggest an action plan that can guarantee optimal performance of the system.

In an embodiment, a data acquisition process collects data from the source by consuming either exposed external service or by using a self-service portal (SSP) services for data extraction. The external service includes but not limited to a Device Hosted Service, a File Transfer Protocol (FTP) service, or a CLOUD service. The SSP service includes but not limited to Data Publishing Service, a Web Crawler, or a data collector. Further, the collected data as defined by a schema is dumped in to a data warehouse using either the SSP service or the external service.

In an embodiment, the schema is used to define the data to be collected from various sources. In an embodiment, the schema can be pre-defined by a user by configuring the system to get the data format from a sample data file or fetch the schema format directly from the data source. The schema needs to be defined before collecting the data from the data source.

In an embodiment, the multi-tenancy framework supports multiple users of an application on a shared infrastructure, and provides users a platform to work on the applications.

In an embodiment, the term multi-structured data refers to a variety of data formats and types. This may further comprise of structured data, unstructured data, relational data, and non-relational data and so on.

In an embodiment, a data warehouse is a database used for reporting and data analysis. It is a central repository of data which is created by integrating data from one or more disparate sources. Data warehouses store current as well as historical data and are used for creating trending reports for reporting such as annual and quarterly comparisons.

Throughout the document, the terms data warehouse and data storage are used interchangeably.

Throughout the document, the terms product schema designer and schema designer are used interchangeably.

In an embodiment, product intelligence (PI) is an automated system for gathering and analyzing intelligence about the performance of a product being designed and manufactured. The analyzed data is used as a reference by the product managers and engineers designing the product to assist them in the development of the next iteration or version of the product. The goal of the PI is to accelerate the rate of product innovation, thereby making the product and its owners more competitive.

In an embodiment, a Non-hierarchical schema consists of records which are stored in the form of single or multiple tables without defining the relationship between the tables.

In an embodiment, a Hierarchical schema consists of collection of data in tabular format. The relationship existing between the tables are analyzed and captured by the framework.

In an embodiment, the stored data is formatted using multiple customized logics that are scheduled to format data in sequence.

In an embodiment, data mining (also referred to as data or knowledge discovery) is the process of analyzing data from different perspectives and summarizing it into useful information. Further, the information can be used to increase revenue, cut costs, or both. Data mining involves process of analyzing data. It allows users to analyze data from many different dimensions or angles, categorize it, and summarize the relationships identified. Technically, data mining is the process of finding correlations or patterns among dozens of fields in large relational databases.

Figure 1:
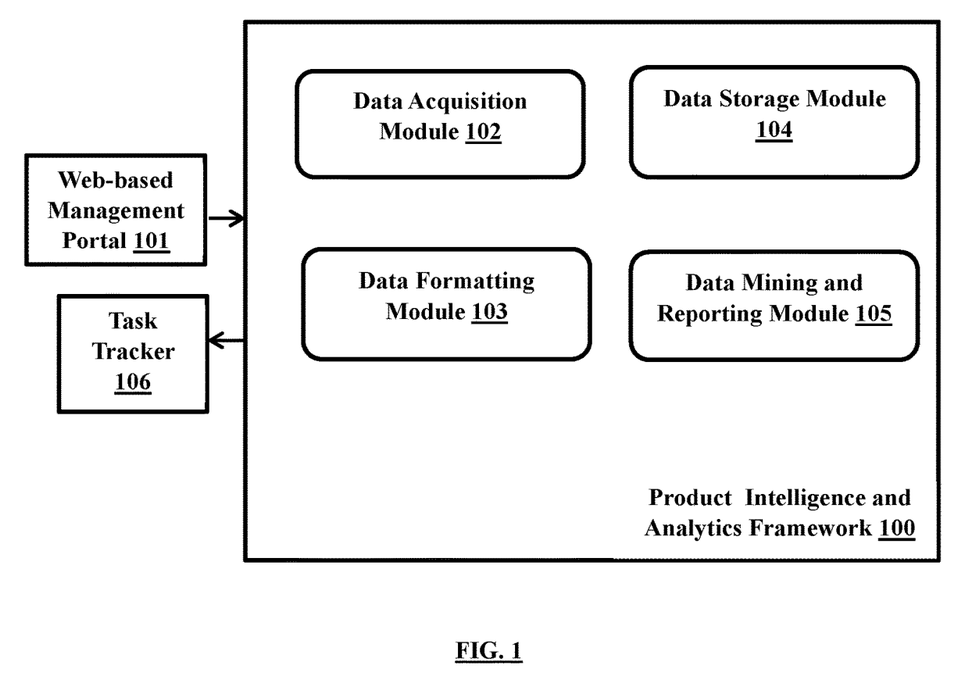
FIG. 1 illustrates a block diagram of the web-based multi-tenant framework for automating operational data analysis process, according to embodiments as disclosed herein.

FIG. 1 illustrates a block diagram of the web-based multi-tenant framework for automating operational data analysis process, according to embodiments as disclosed herein. As depicted in the Product Intelligence and Analytics Framework Figure 100, the framework enables users to perform ODA of a system using a web-based management portal. The framework allows the user to perform data analysis by using a data acquisition module 102 that implements the data acquisition process, a data formatting module 103 that implements the data formatting process, a data storage module 104 that stores the mapped data in a data warehouse, and a data mining and reporting module 105 that analyzes the data and generates report for the analyzed data. Further, each of the tasks performed by these modules is tracked using a Task Tracker 106 module.

Figure 2:
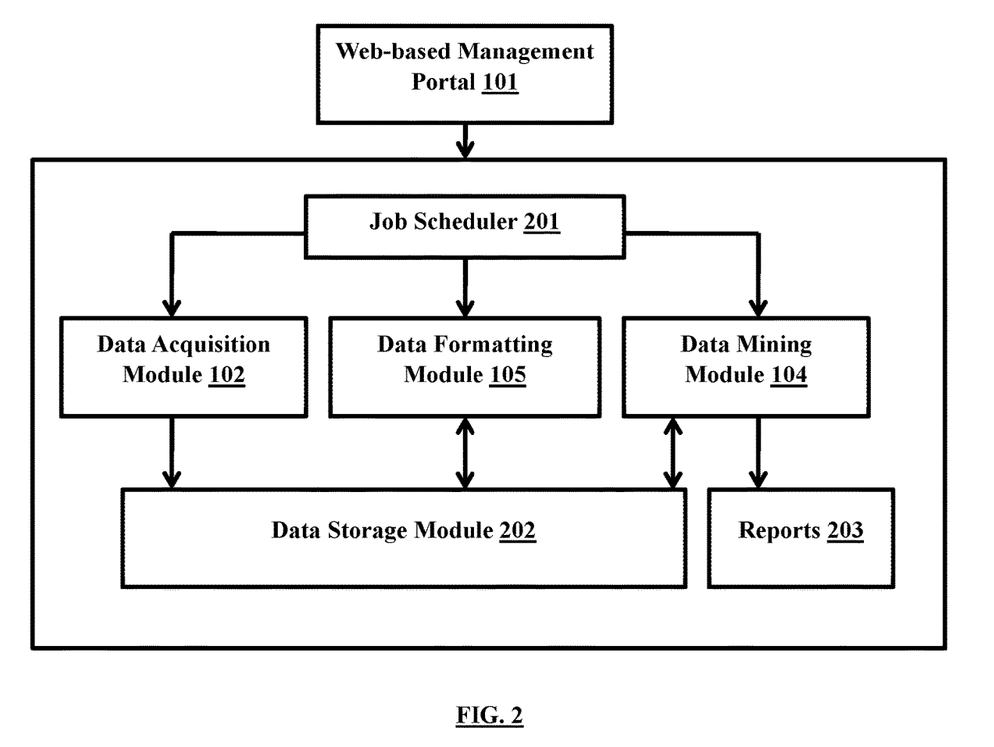
FIG. 2 illustrates system configuration of the web-based multi-tenant framework for job scheduling, according to embodiments as disclosed herein.

FIG. 2 illustrates system configuration of the web-based multi-tenant framework for job scheduling, according to embodiments as disclosed herein. As depicted in the figure, a web-based multi-tenant management portal module 101 is used to configure a Job scheduler 201. The Job scheduler 201 schedules the following modules within the framework:

the data acquisition module 102 for collecting data from various sources, the Data formatting module 105 for scheduling data formatting in sequence, the Data mining module 104 for scheduling the data mining process, and further the Data acquisition module is scheduled to transfer data from the source to the selected data warehouse in a structured format as configured in the data storage module 202.

Figure 3:
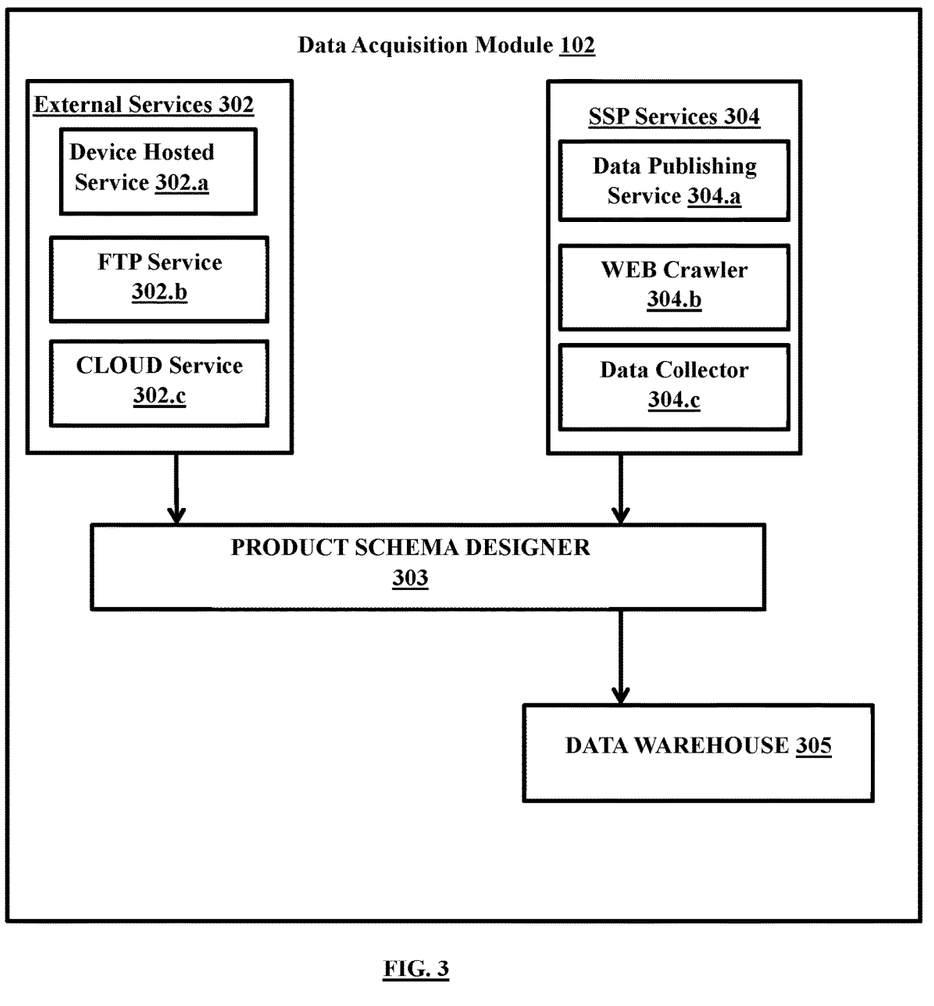
FIG. 3 illustrates block diagram that shows components of the data acquisition module and data storage module along with the schema designer for defining data format, according to embodiments as disclosed herein.

FIG. 3 illustrates block diagram that shows components of the data acquisition module and data storage module along with the schema designer 303 for defining data format, according to embodiments as disclosed herein. As depicted in the figure, the data acquisition module 102 implements a data acquisition process. The data acquisition process collects data from the source by consuming either exposed external URI 302 or by exposing the tool self-service portal (SSP) service 304 for data extraction. The external service 302 includes but not limited to a Device Hosted Service 302.*a*, an FTP service 302.*b*, or a CLOUD service 302.*c*, and the SSP service 304 includes but not limited to Data Publishing Service 304.*a*, Web Crawler 304.*b*, or a data collector 304.*c*. Further, the data to be collected is defined using a schema defined by providing a sample structure file or by connecting to the data source directly. User can select/define the fields for which the data is to be collected from the list of fields available. Further, the data transfer happens in accordance with the schema.

In an embodiment, the Device Hosted Service 302.*a* collects raw data by consuming source exposed end points from the source Uniform Resource Identifier (URI) location. The data collected from the source, which is defined by the schema, is uploaded in the data warehouse by using the service and as per the schedule designed by the Job Scheduler 201.

In an embodiment, the FTP service accesses the URI and uploads large amount of data from the location, and stores the data in the data warehouse as per the required format. The FTP service is scheduled by the Job scheduler and the tasks are performed as per the schedule.

In an embodiment, the CLOUD service collects data from cloud storage. The storage account is verified and authenticated before accessing data from the cloud storage. In an embodiment, the SSP service provides the user an option to collect data for data processing by selecting at least one of the SSP service, such as a Data Publishing Service (DPS), a Web crawler, a DB Data collector or the like. The DPS service specifies the Uniform Resource Locator (URL) where the user can dump the data to be collected, the Web crawler is used to specify the URL to be crawled to a defined level, to collect the data from URL page source, and the DB Data collector is used to specify the database connecting string with a table name or a store procedure from where data is to be collected. In addition, the user can select the External services for collecting the data from the data source by consuming source end points. For example, the External services include but not limited to an FTP service, a CLOUD service, or a Device Hosted service.

In an embodiment, the DPS service specifies the URL where the user can dump the data to be collected. Further the service uploads the data in the configured data warehouse (as defined by the schema designer 303) as defined by the schema as per the schedule configured in the job scheduler 201.

In an embodiment, the DB Data Collector is used to collect data when the data source is a database such as an SQL Server, My SQL and/or Oracle. The data is extracted from the data source by using an appropriate database connection and authentication.

In an embodiment, the Web crawler searches for a specific text pattern as defined according to rules in rule.xml file by crawling in the URL provided by the user to a defined level, and collect the data as defined according to rules in rule.xml. The extracted data is stored in the data warehouse as defined by the schema.

The schema designer 303 is used for defining data, and various services are used to collect data from the source and upload the data into a data warehouse as defined by the schema.

The collected data is stored in the data warehouse according to a schema defined by the product schema designer 303 module. The schema designer 303 supports a schema in a delimited sample data file available in any of the following formats: Extensible Markup Language (XML), Java Script Object Notation (JSON), Comma-Separated-Values (CSV), or TXT format. The schema supports data collection and storage in both Hierarchical and Non-Hierarchical representation.

In an embodiment, the data warehouse for storing data includes but not limited to Hadoop Distributed File System (HDFS), Windows Azure Storage, CLOUD or it can be a traditional data store like Microsoft SQL Server, Oracle or MySQL. Further, the raw data i.e. data collected from the source is transmitted to the data warehouse using storage drivers.

Figure 4:
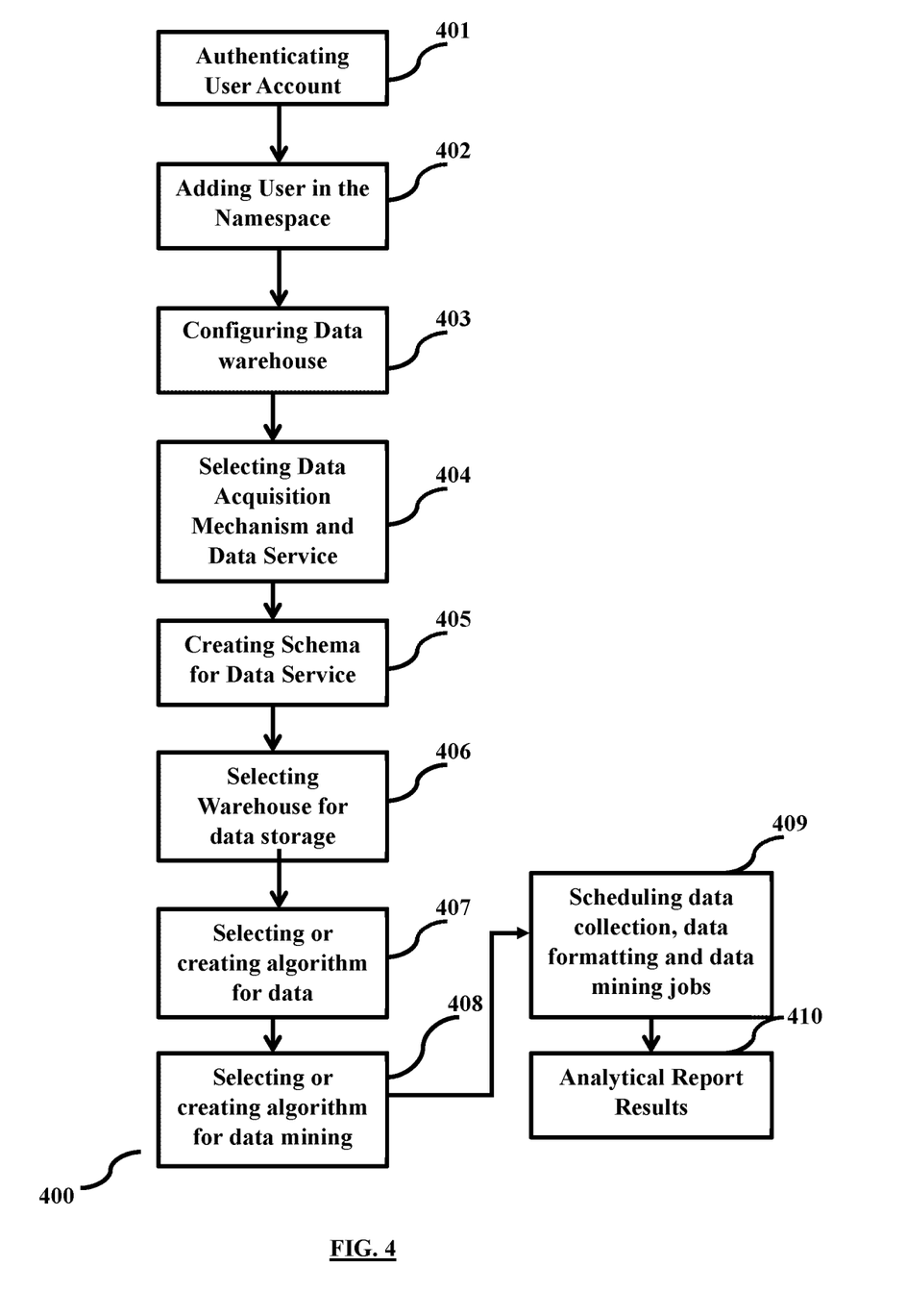
FIG. 4 illustrates a flow diagram that depicts various steps involved in the process of automating the operational data analysis using the web-based management framework, according to embodiments as disclosed herein.

FIG. 4 illustrates a flow diagram that depicts various steps involved in the process of automating the operational data analysis using the web-based management framework, according to embodiments as disclosed herein. As depicted in the FIG. 400, the web-based management portal authenticates a user-account before allowing the user to configure and perform the ODA analysis within the framework. After authenticating (401) and validating the user-account, a system administrator configures (402) the PI metadata database and the data warehouse (HDFS, SQL Server, MySql, Oracle, Cloud). The system administrator creates a namespace and a user for the namespace on a system server. The user logs into the system using the namespace and creates a product within the namespace for processing the stored data.

Further, the user can select (403) the data warehouse for storing the data. For example, the data warehouse can be configured to store data on a Hadoop platform, CLOUD storage, local data storage, or the like. In an embodiment, a namespace is an abstract container or environment created for an enterprise to support multi tenancy in the system. The namespace holds a logical grouping of unique identifiers or symbols (names) called a product. An identifier defined in a namespace is associated only with that namespace.

Further, the framework allows the user to configure (404) the data acquisition mechanism for collecting data from the source either by using an external service or an SSP service. The external service 302 includes but not limited to a Device Hosted Service 302.*a*, an FTP service 302.*b*, or a CLOUD service 302.*c*, and the SSP service 304 includes but not limited to Data Publishing Service 304.*a*, Web Crawler 304.*b*, or a data collector 304.*c*. A Namespace is created for an enterprise, with number of products existing for a single Namespace. After creating (405) the Namespace for the enterprise, ODA is to be performed on each of the products existing in the Namespace, schema is created for the product by specifying the data types and attributes in a delimiter file supported in XML/JSON/CSV/TXT format or by connecting to the data source through the FTP service, the Device Hosted Service, the CLOUD service, or the DB Collector service. Further, the framework provides an option to select (406) the storage from a list of configured data warehouse.

After selecting the storage, users will be provided with an option to select (407) an already existing data formatting algorithm, (for example: Map/Reduce algorithm) or to create a new data formatting algorithm to format the data. In the next step, the framework provides an option for the user to select (408) an existing data mining algorithm (that includes but not limited to Pegasus, Query Builder, Report designer) or create a new data mining algorithm. Further, the Job scheduler 201 is scheduled (409) to perform all the tasks configured in the framework. Finally, the framework generates (410) report based on the ODA analysis. The various actions in method 400 may be performed in the order presented. Further, in some embodiments, some actions listed in FIG. 4 may be omitted.

Figure 5:
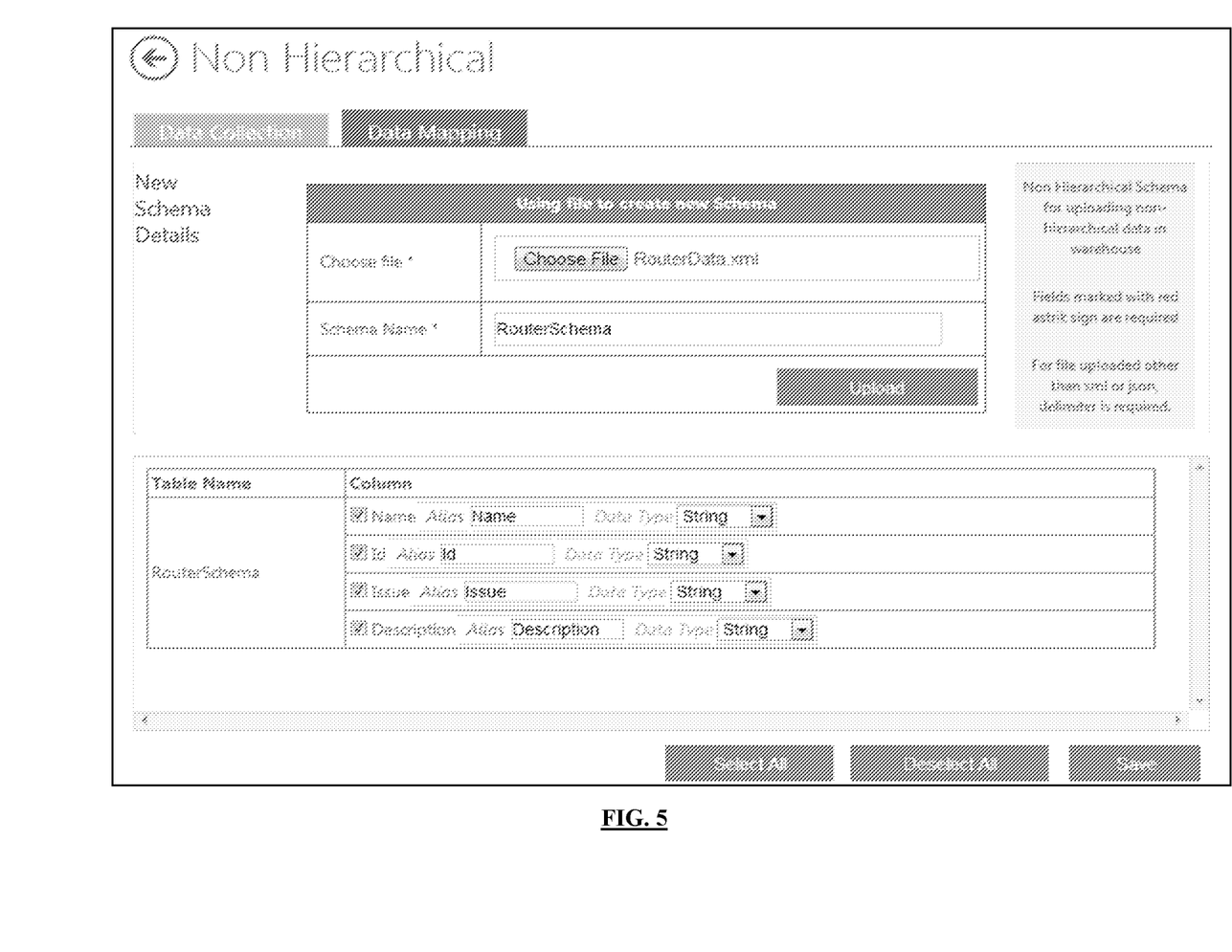
FIG. 5 illustrates an example defining the data as a Non-Hierarchical schema, according to embodiments as disclosed herein.

FIG. 5 illustrates an example defining the data as a Non-Hierarchical schema, according to embodiments as disclosed herein. As depicted in the figure, the Non-Hierarchical schema defines the data in a tabular format without specifying any relation between them.

Figure 6:
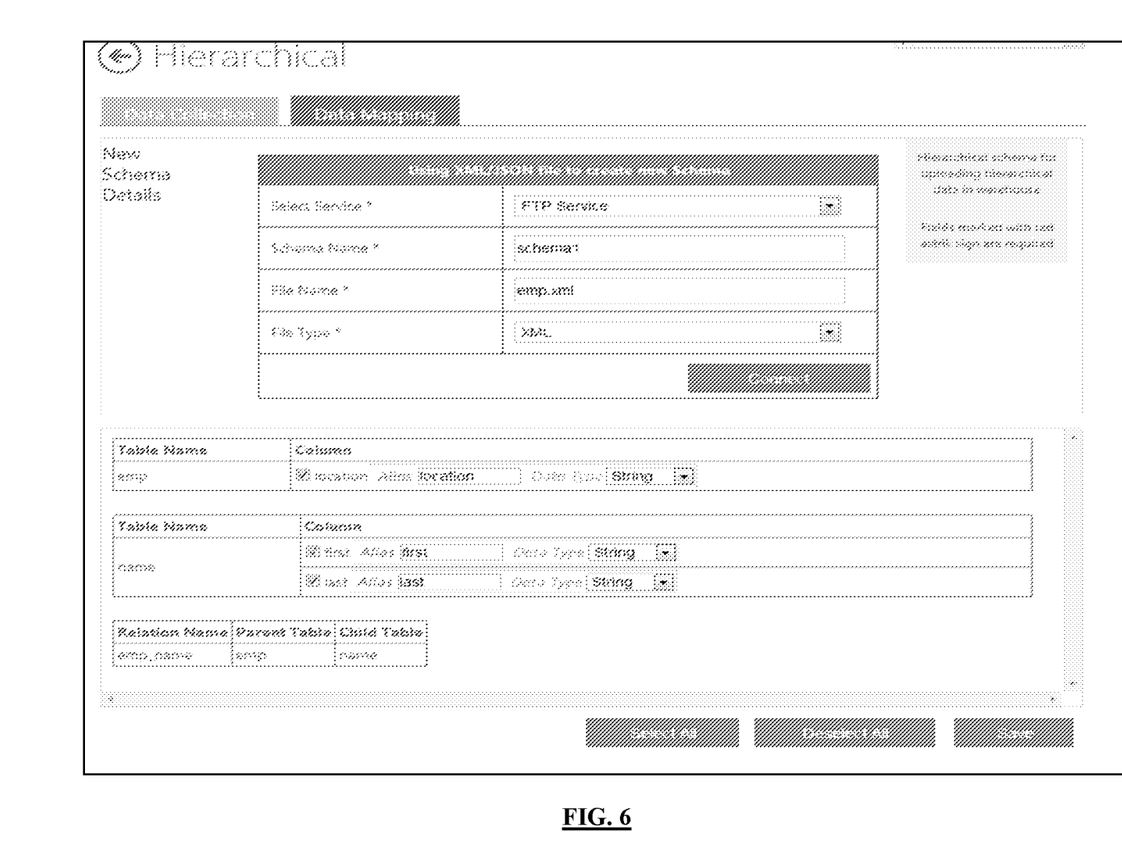
FIG. 6 illustrates an example defining the data as a Hierarchical schema, according to embodiments as disclosed herein.

FIG. 6 illustrates an example defining the data as a Hierarchical schema, according to embodiments as disclosed herein. As depicted in the figure, the Hierarchical schema defines the data in a tabular form. Further, the relationship existing between the tables can be analyzed by the framework.

Figure 7:
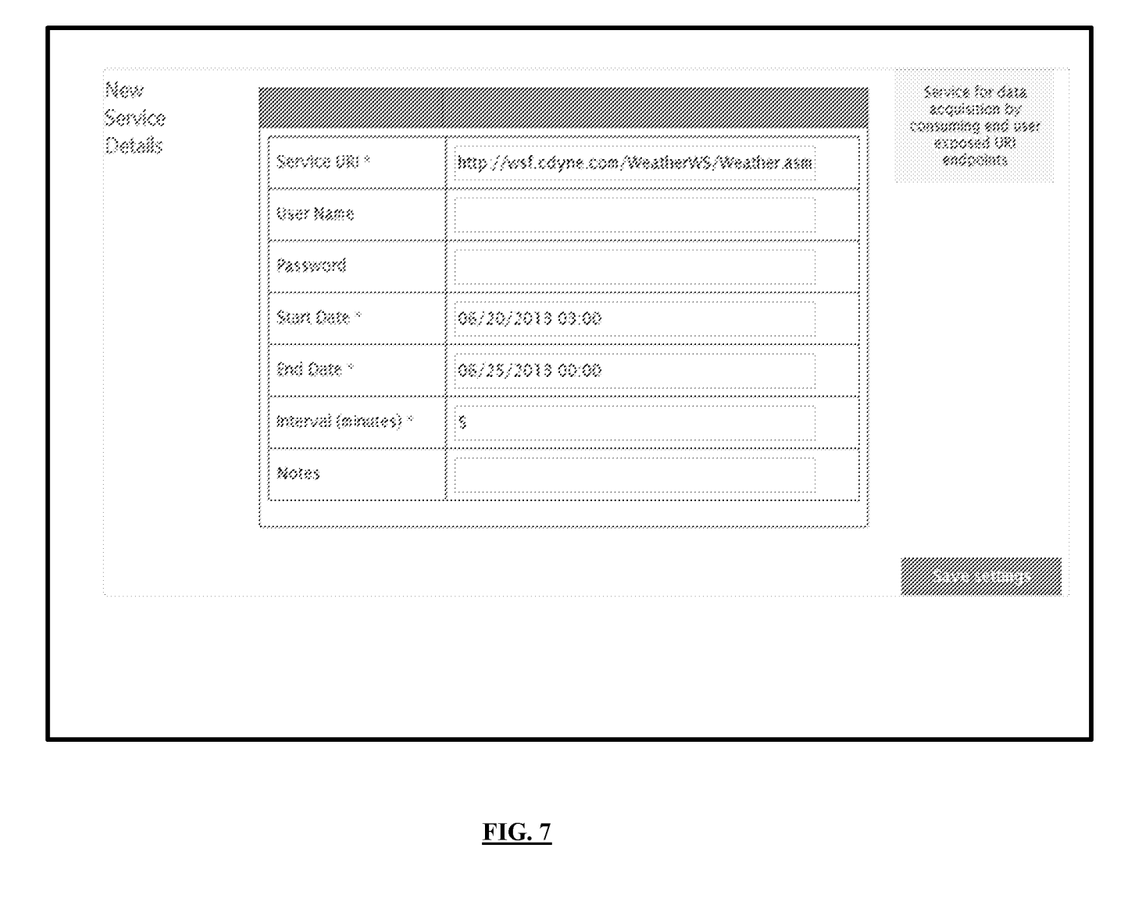
FIG. 7 illustrates an example format of interface used to provide a service Uniform Resource Identifier (URI) to implement a data acquisition process from various sources, according to embodiments as disclosed herein.

FIG. 7 illustrates an example format of interface used to provide a service Uniform Resource Identifier (URI) to implement a data acquisition process from various sources, according to embodiments as disclosed herein. As depicted in the figure, the interface allows the user to configure the device hosted service for collecting data from the source.

Figure 8:
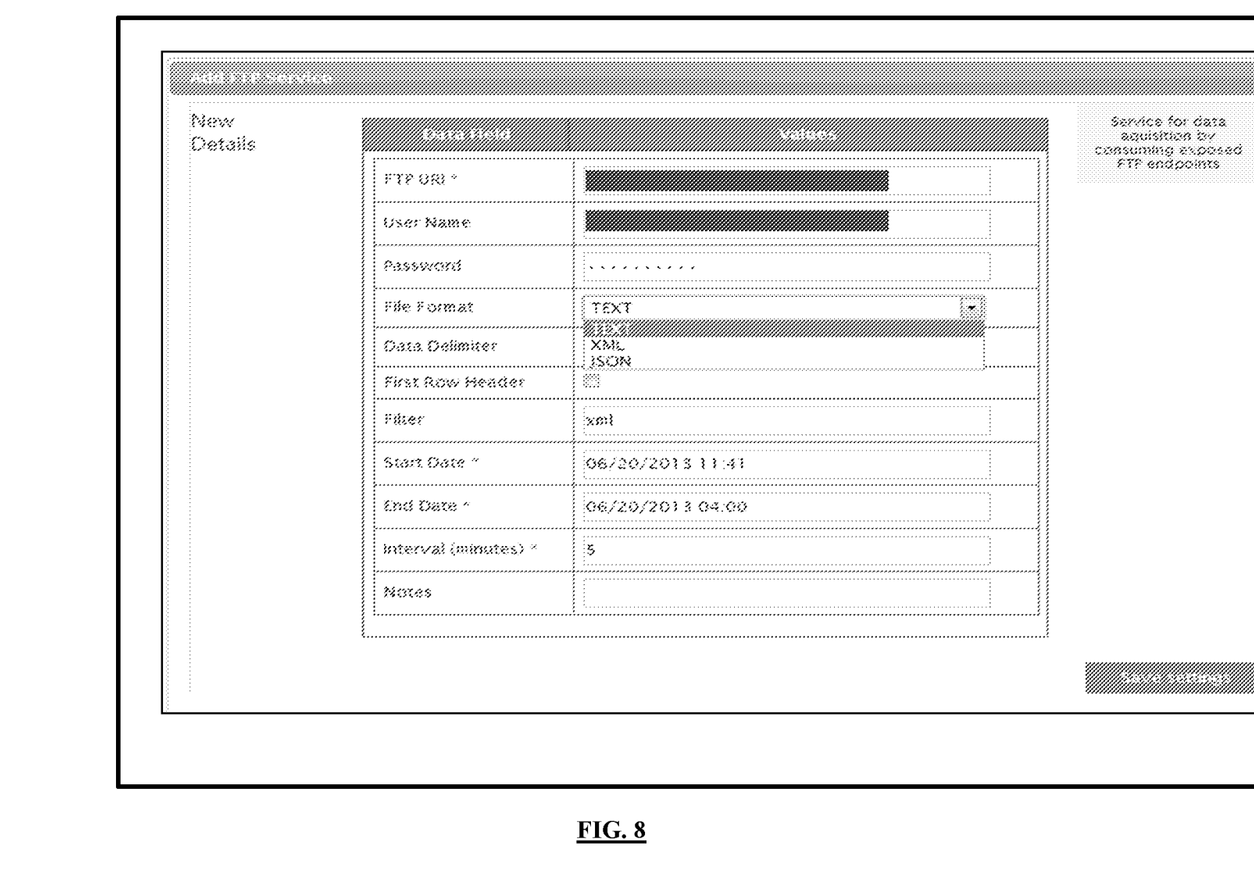
FIG. 8 illustrates an example interface used to configure an FTP service for consuming data from an exposed FTP URI, according to embodiments as disclosed herein.

FIG. 8 illustrates an example interface used to configure an FTP service for consuming data from an exposed FTP URI, according to embodiments as disclosed herein. As depicted in the figure, the interface allows the user to configure an FTP service for extracting the data from the source FTP end points.

Figure 9:
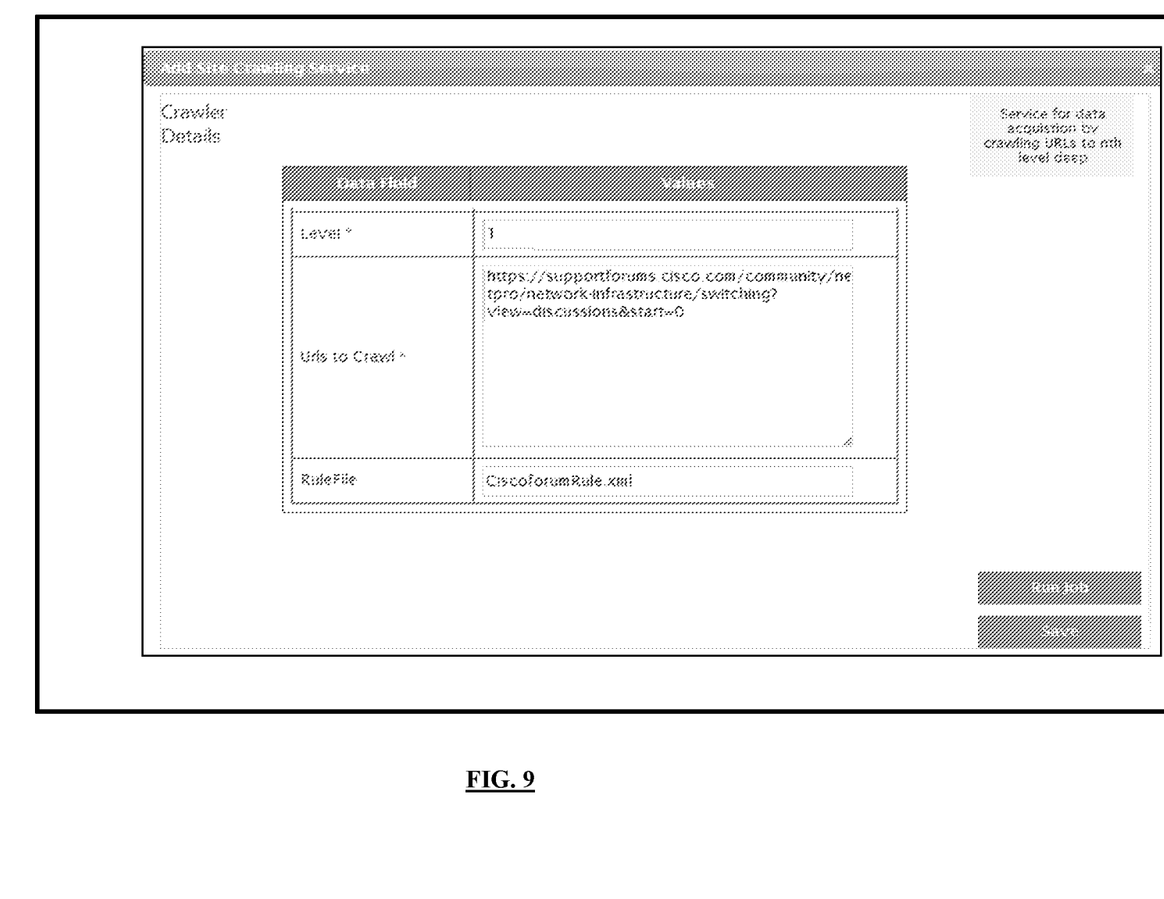
FIG. 9 illustrates an example interface to provide Uniform Resource Locator (URLs) to be crawled for data acquisition as per the rules defined, according to embodiments as disclosed herein.

FIG. 9 illustrates an example interface to select a Uniform Resource Locator (URLs) to be crawled for data acquisition as per the rules defined, according to embodiments as disclosed herein. As depicted in the figure, the interface allows the user to specify the URL to be crawled, the level for which it needs to be crawled, and to browse the rule file.

Figure 10:
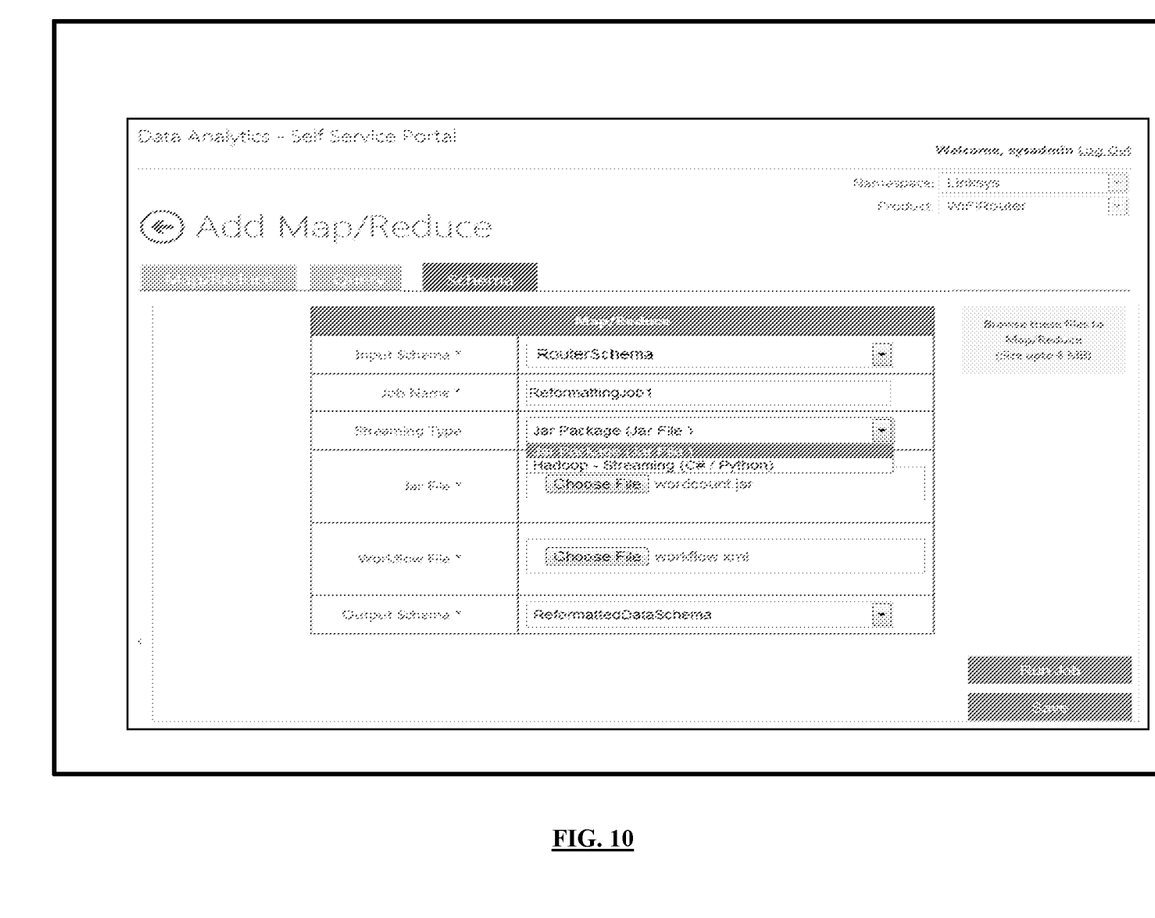
FIG. 10 illustrates an example interface to select a Map/Reduce algorithm to implement a data reduction process, according to embodiments as disclosed herein.

FIG. 10 illustrates an example interface to select a Map/Reduce algorithm to implement a data reduction process, according to embodiments as disclosed herein. As depicted in the figure, the interface allows the user to specify the Map/Reduce algorithm details for implementing the data reduction process in the extracted data.

Figure 11:
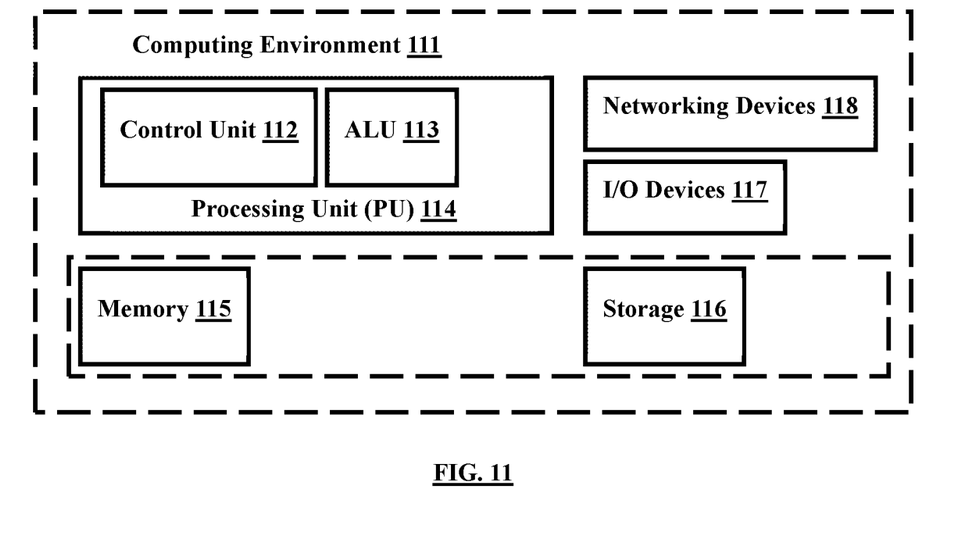
FIG. 11 illustrates a computing environment implementing the method of automating operational data analysis using a web-based multi-tenant framework, according to embodiments as disclosed herein.

FIG. 11 illustrates a computing environment implementing the method of automating operational data analysis using a web-based multi-tenant framework, according to embodiments as disclosed herein. As depicted the computing environment 111 comprises at least one processing unit 114 that is equipped with a control unit 112 and an Arithmetic Logic Unit (ALU) 113, a memory 115, a storage unit 116, plurality of networking devices 118 and a plurality Input output (I/O) devices 117. The processing unit 114 is responsible for processing the instructions of the algorithm. The processing unit 114 receives commands from the control unit in order to perform its processing. Further, any logical and arithmetic operations involved in the execution of the instructions are computed with the help of the ALU 113.

The overall computing environment 111 can be composed of multiple homogeneous and/or heterogeneous cores, multiple CPUs of different kinds, special media and other accelerators. The processing unit 114 is responsible for processing the instructions of the algorithm. Further, the plurality of processing units 404 may be located on a single chip or over multiple chips.

The algorithm comprising of instructions and codes required for the implementation are stored in either the memory unit 115 or the storage 116 or both. At the time of execution, the instructions may be fetched from the corresponding memory 115 and/or storage 116, and executed by the processing unit 114.

In case of any hardware implementations various networking devices 118 or external I/O devices 117 may be connected to the computing environment to support the implementation through the networking unit and the I/O device unit.

The embodiments disclosed herein can be implemented through at least one software program running on at least one hardware device and performing network management functions to control the network elements. The network elements shown in FIGS. 1, 2, 3, and 4 include blocks which can be at least one of a hardware device, or a combination of hardware device and software module.

The embodiment disclosed herein specifies a system for automating ODA process within a multi-tenant framework. The mechanism allows an authenticated user to collect data from various sources, by defining the data to be collected as per the pre-defined schema, store the collected data in a data warehouse, format the stored data, and analyze the data as required. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method for automating operational data analysis on a multi-structured data using a web-based multi-tenant framework, said method comprising: collecting data based on a pre-defined schema from at least one of a plurality of data sources using at least one data collection service, wherein the pre-defined schema is defined by one of providing a sample structure file and connecting to a data source directly, wherein a user is configures a data acquisition mechanism for collecting the data from a data source by consuming one of exposed external service and by using a self-service portal (SSP) services, wherein said collected data is at least one of a Hierarchical data and a Non-Hierarchical data; creating a namespace for an enterprise, with a plurality of products existing for the namespace: creating a product schema for each product from the plurality of products in the namespace, wherein the product schema is created for the product by one of specifying at least one data type and at least one attribute in a delimiter file and by connecting to the data source through one of the FTP service, the Device Hosted Service, the CLOUD service, and the DB Collector service, wherein the delimiter file is supported by one of Extensible Markup Language (XML), Java Script Object Notation (JSON), Comma-Separated-Values (CSV), and TXT formats, wherein the product schema supports data collection and storage in one of hierarchical representation and non-hierarchical representation; selecting a data warehouse for storing the data; formatting said stored data, wherein the formatting comprises providing a user with an interface to one of: selecting an already existing data formatting process; and creating a new data formatting process; analyzing said formatted data, wherein sequence of said collection, formatting and analysis of said data is pre-scheduled; and reporting said analyzed data.

2. A system for automating operational data analysis on a multi-structured data, said system provided with means for: collecting data based on a pre-defined schema from at least one of a plurality of data sources using at least one data collection service using a product intelligence and analytic framework, wherein the predefined comprises schema is defined by one of providing a sample structure file and connecting to a data source directly, and wherein a user configures a data acquisition mechanism for collecting the data from a data source by consuming one of exposed external service and by using a self-service portal (SSP) service wherein said collected data is at least one of a Hierarchical data and a Non-Hierarchical data; create a namespace for an enterprise, with a plurality of products existing for the namespace; create a product schema for each product from the plurality of products in the namespace, wherein the product schema is created for the product by one of specifying at least one data type and at least one attribute in a delimiter file and by connecting to the data source through one of the FTP service, the Device Hosted Service, the CLOUD service, and the DB Collector service, wherein the delimiter file is supported by one of Extensible Markup Language (XML), Java Script Object Notation (JSON), Comma-Separated-Values (CSV), and TXT formats, wherein the product schema supports data collection and storage in one of hierarchical representation and non-hierarchical representation; select a data warehouse for storing the data; formatting said stored data using said product intelligence and analytic framework, wherein the product intelligence and analytic framework is to format the stored data by providing a user with an interface to one of: selecting an already existing formatting process; and creating a new data formatting process; analyzing said formatted data using said product intelligence and analytic framework, wherein said product intelligence and analytic framework provides means for pre-scheduling sequence of said collection, formatting and analysis of said data using a web based management portal; and reporting said analyzed data using said product intelligence and analytic framework.

3. The method as claimed in claim 1, wherein said collected data is at least one of a Hierarchical data, or a Non-Hierarchical data.

4. The method as claimed in claim 1, wherein said schema is defined by connecting directly to a data source file; wherein said data source file defines format of said data to be collected.

5. The method as claimed in claim 1, wherein said data storage is selected dynamically based on a set user preference.

6. The method as claimed in claim 1, Wherein said stored data is formatted using at least one of a plurality of formatting algorithms, wherein sequence of said plurality of formatting algorithms is pre-scheduled.

7. The method as claimed in claim 1, wherein said analyzing said stored data further comprises identifying at least one of a plurality of patterns, rules and anomalies associated with said stored data.

8. The system as claimed in claim 2, wherein said product intelligence and analytic framework is configured for collecting at least one of a Hierarchical data, or a Non-Hierarchical data from at least one of said plurality of sources using a data acquisition module.

9. The system as claimed in claim 2, wherein said product intelligence and analytic framework provides means for selecting said data storage dynamically based on a set user preference using a web based management portal.

10. The system as claimed in claim 2, wherein said product intelligence and analytic framework provides means for formatting said stored data using at least one of a plurality of formatting algorithms using a data formatting module, wherein sequence of said plurality of formatting algorithms is pre-scheduled.

11. The system as claimed in claim 2, wherein said product intelligence and analytic framework is further configured to analyze said stored data by identifying at least one of a plurality of patterns, rules and anomalies associated with said stored data using a data mining and reporting module.

12. The method as claimed in claim 7, wherein said stored data is analyzed using at least one of a plurality of analysis algorithms, wherein sequence of said plurality of analysis algorithms is pre-configured.

13. The system as claimed in claim 11, wherein said product intelligence and analytic framework is further configured to analyze said stored data using at least one of a plurality of analysis algorithms using data mining and reporting module, wherein sequence of said plurality of analysis algorithms is pre-configured.

* * * * *